Nov. 13, 1956  R. BRODER  2,770,276
SET SCREW WITH BALL EXPANDER LOCKING MEANS
Filed April 17, 1952
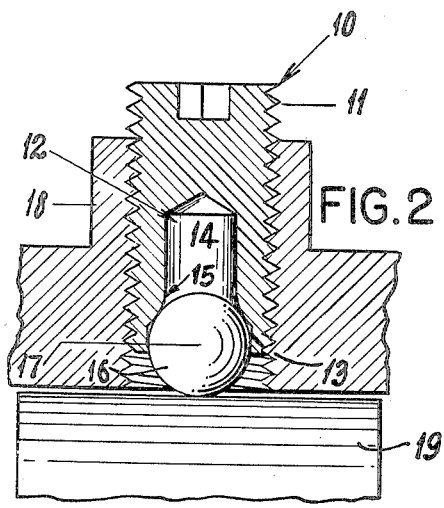
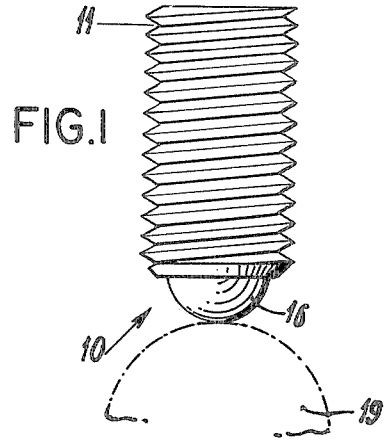
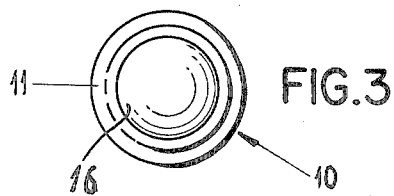
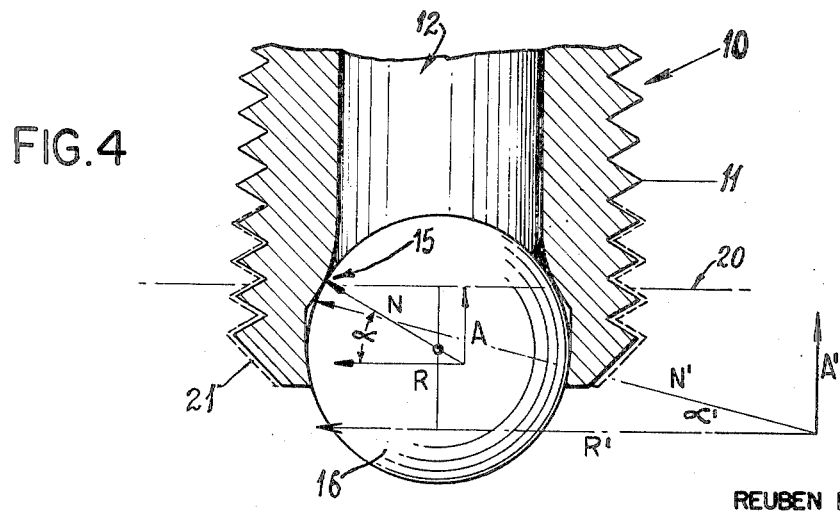
REUBEN BRODER
INVENTOR
BY Joseph Blacker
ATTORNEY

United States Patent Office 2,770,276
Patented Nov. 13, 1956

2,770,276
SET SCREW WITH BALL EXPANDER LOCKING MEANS

Reuben Broder, Brooklyn, N. Y.

Application April 17, 1952, Serial No. 282,810

3 Claims. (Cl. 151—31)

This invention relates to set screws and the like, and an object of this invention is to provide a set-screw with an automatic self-contained locking mechanism which serves to lock the set-screw in set position when secured or driven home by a wrench or driving tool.

Another object of this invention is to provide a self-contained self-locking set-screw having an opening in which is mounted a projecting ball coupled as a unit with the set-screw and which is designed to permit forcing the ball against the contacting wall defining the opening, whereby when the screw is forcibly threaded against a part to be locked by the screw, slight inward movement of the ball takes place within the screw, causing radial expansion of the screw threads at the lower portion of the screw and a wedging action against the mating threads, preventing disengagement of the screw when subjected to vibrations.

Another object of this invention is to form a convex peripheral surface at a portion or section inside of the central opening, whereby the ball seated in the opening contacts the convex surface only at a single plane and functions to progressively decrease the increment of the driving force required to additionally expand the outer surface portion of the screw threads, thus giving increased mechanical advantage.

With the above and other objects in view, the invention will be hereinafter more particularly described, and the combination and arrangement of parts will be shown in the accompanying drawings and pointed out in the claims which form part of this specification.

Reference will now be had to the drawings, wherein like numerals of reference designate corresponding parts throughout the several views, in which:

Figure 1 is an elevational view of my type of ball-tip set-screw.

Figure 2 is a fragmentary cross-sectional view, on an enlarged scale, showing the set-screw threaded in a socket and with the ball end of the set screw in contact with an element against which pressure is exerted.

Figure 3 is a bottom view of the set-screw shown in Figure 1.

Figure 4 is a cross-sectional view of the screw on a greatly enlarged scale showing a stress diagram.

In the illustrated embodiment of the invention, the numeral 10 indicates a laterally expandable two-member self-locking set screw comprising a screw 11 having a centrally positioned elongated opening 12 terminating in a cylindrical portion 13 at the outer end of the opening. The inner end of the opening 12 terminates in a cylindrical portion 14. A convex or bell-mouth section 15 connects the cylindrical portions 13 and 14.

A ball 16 is seated in the cylindrical portion 13 in contacting relation with the convex or bell-mouth section 15 at a single plane. The center 17 of the ball 16 is positioned slightly inward of the lower end face of the screw 11, permitting deformation of the outer edge defining the cylindrical portion 13 and retaining the ball 16 against disengagement from the screw.

It will thus be seen that there is provided a two-member interengaged bodily intact unitary structure 10, comprising a set screw 11, and a ball 16, which remain integral under all operating conditions.

When the screw 11 is in a socket 18 and forcibly threaded against a machine part 19 to be locked by the screw, slight inward movement of the ball takes place against the convex or bell-mouth section 15 of the screw, thereby causing the expansion of the screw threads at the lower portion of the screw, resulting in a wedging action against the mating threads of the socket 18, thus preventing disengagement of the two-member set screw 10 from its set position against the machine part 19 when subjected to vibrations. The combination of a ball with a convex or bell-mouth-shaped cavity as a means of expanding the threads of the screw brings about progressively increased mechanical advantage in fastening and augmented self-locking of the set-screw.

It is to be noted that in comparison with a screw having a tapering central opening wherein a ball may be mounted to cause radial expansion, that my convex peripheral or bell mouth section 15 requires less working force in the operation of my screw.

The sequence occurring is as follows:

1. Initially, the screw is tightened until the ball engages the member to be locked or fastened.

2. Increased tightening of the screw results in the lower threads of the screw expanding and engaging the mating threads of the tapped hole and increasing the internal diameter of the opening thus engaging the ball operatively connected to said screw at a point further up in the cup.

3. Further tightening increases the number of mating threads engaged and expands the entire internal space in the bell mouth area, thus permitting the decrease in the angle $\alpha$ as shown at $\alpha'$.

When a convex peripheral or bell mouth section is used, a condition results which is defined by the following relationships.

$$\text{sine } \alpha = \frac{A}{N}$$

$$\text{cosine } \alpha' = \frac{R}{N}$$

Term definitions:

$A$ = axial force component
$R$ = radial force component
$N$ = force on bell shaped opening at point of action
$\alpha$ = angle of contact with plane perpendicular to axis As A is increased due to the increased torquing of the screw, an axial movement of the screw 11 with relation to the ball 16 takes place. However, with axial movement of the screw, there is a decrease in the angle $\alpha$, to the angle $\alpha'$.

It is evident therefore, that an increase in A due to the increased torquing of the screw will result in an increase in N and R, but not proportionately so; i. e., if A is doubled, N and R are more than doubled, thus securing increased mechanical advantage.

As shown by the dotted lines in Figure 4, the lower threads of the screw 11 expand in a lateral direction when pressure is applied to the screw. The pressure causes the ball 16 to be forced slightly into the interior of the screw at the bell-mouth 15 where the ball contacts the bell-mouth at a plane 20 where the ball and bell-mouth come into tangential relation. The lowermost threads 21 expand more than the upper threads. The expansion of the threads lessens progressively towards the head of the screw.

It is to be noted that the ball applies pressure at the line of common tangency. The lowest mating thread will engage first. Increased force will increase the number of threads engaged starting from the bottom mating thread.

It is to be noted that while I have shown a ball as the actuating means for expanding the threads, that any other non-linear insert may be used provided it functions to expand the lower threads of the set screw. It is also to be noted that the degree of increasing of the mechanical advantage may be controlled by proper design of the ball or the convex surface or both.

It is also to be noted that the lower portion of the ball or insert may be round, flat, cupped, cone pointed or any other selected design.

In accordance with the patent statutes I have described and illustrated the preferred embodiment of my invention, but it will be understood that various changes and modifications can be made therein without departing from the spirit of the invention as defined by the appended claims.

I claim:

1. In a bodily intact laterally expandable self-locking screw, comprising a two-member interengaged unitary structure, said expandable screw having a centrally positioned elongated opening terminating in upper and lower cylindrical portions at opposite ends, said cylindrical portions being connected by a convex section, a ball seated in said lower cylindrical portion and in contacting relation with said convex section at a single plane, the center of said ball being slightly inward of the lower end face of said screw, the outer edge of the lower opening extending inwardly and engaging said ball below the center line thereof retaining said ball against disengagement from said screw, whereby when said screw is forcibly threaded against a part to be locked by said screw, inward movement of said ball takes place against said convex section surface defining said opening and a wedging action against the mating threads, preventing disengagement of said screw when subjected to vibrations.

2. In a bodily intact non-slotted laterally expandable self-locking screw, comprising a two-member interengaged unitary structure, said expandable screw having a centrally positioned opening defined by a convex peripheral surface terminating in a cylindrical outer portion, a ball operatively connected to said screw seated in said lower cylindrical portion and in contacting relation with said convex walls at a single plane so as to provide a clearance space for movement of said ball above the line of contact of said ball, permitting movement of said ball axially of said screw, the center of said ball being slightly inward of the outer end face of said screw, thus permitting deformation of the outer edge defining said opening and retaining said ball against disengagement from said screw, whereby when said screw is forcibly threaded against a part to be locked by said screw, axial movement of said ball takes place against said convex peripheral surface thereby causing increasing mechanical advantage and decreasing increments of axial force to be required for attaining constant increments of radial force in the locking of said bodily intact screw, and expansion of the screw threads at the opening of said screw at said ball and a wedging action against the mating threads, preventing disengagement of said screw when subjected to vibrations.

3. In a bodily intact radially expandable self-locking screw, comprising a self-contained two-member interengaged unitary structure, said expandable screw having a centrally positioned elongated opening terminating in upper and lower cylindrical portions at opposite ends thereof, said screw having a convex section connecting said cylindrical portions, said lower cylindrical portion being of larger diameter than said upper cylindrical portion, said convex shaped section connecting said cylindrical portions, a ball mounted in said lower cylindrical portion having a clearance space thereabove, operatively connected to said screw and in contacting relation with said bell mouth shaped section at a single plane, the center of said ball being positioned slightly inward of the lower end face of said screw, thus permitting deformation of the outer edge defining said lower opening of said screw and retaining said ball against disengagement from said screw, whereby when said screw is forcibly threaded against a part to be locked by said screw, said ball is tensioned in a direction inwardly of said opening, causing radial expansion of the bodily intact screw threads at the lower portion of said screw and a wedging action against the mating threads, preventing disengagement of said screw from the part being locked, when subjected to vibrations.

References Cited in the file of this patent

UNITED STATES PATENTS

| 1,438,648 | Jacobs | Dec. 12, 1922 |
| 2,533,748 | Weissert | Dec. 12, 1950 |

FOREIGN PATENTS

| 279,072 | Italy | Oct. 30, 1930 |